United States Patent
Yamaguchi

(10) Patent No.: US 10,156,272 B2
(45) Date of Patent: Dec. 18, 2018

(54) ONE-WAY CLUTCH AND IMAGE FORMING APPARATUS

(71) Applicant: CANON KABUSHIKI KAISHA, Tokyo (JP)

(72) Inventor: Yoshimasu Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/375,311

(22) Filed: Dec. 12, 2016

(65) Prior Publication Data

US 2017/0184158 A1    Jun. 29, 2017

(30) Foreign Application Priority Data

Dec. 25, 2015 (JP) ................... 2015-254723

(51) Int. Cl.
| | |
|---|---|
| *F16D 41/067* | (2006.01) |
| *F16D 48/06* | (2006.01) |
| *G03G 15/16* | (2006.01) |
| *F16D 27/01* | (2006.01) |

(52) U.S. Cl.
CPC ........ *F16D 41/067* (2013.01); *F16D 48/064* (2013.01); *G03G 15/1615* (2013.01); *F16D 27/01* (2013.01); *F16D 2300/06* (2013.01)

(58) Field of Classification Search
None
See application file for complete search history.

(56) References Cited

U.S. PATENT DOCUMENTS

| | | | |
|---|---|---|---|
| 4,770,279 A | 9/1988 | Shiozaki et al. | |
| 8,251,195 B2* | 8/2012 | Li | F16C 32/0414 192/45.017 |
| 9,599,171 B2 | 3/2017 | Yamaguchi et al. | |
| 2002/0005325 A1* | 1/2002 | Yamada | F16D 41/067 192/38 |
| 2002/0127013 A1* | 9/2002 | Mizumaki | G03B 9/08 396/463 |

(Continued)

FOREIGN PATENT DOCUMENTS

| | | |
|---|---|---|
| JP | 62-228721 A | 10/1987 |
| JP | 3-288025 A | 12/1991 |

(Continued)

*Primary Examiner* — Mark A Manley
(74) *Attorney, Agent, or Firm* — Fitzpatrick, Cella, Harper & Scinto

(57) ABSTRACT

A one-way clutch is configured to allow rotation in one direction with respect to a shaft and regulate rotation in the other direction, and includes a housing, a plurality of needles, a plurality of magnets, a plurality of first accommodating portions, and a plurality of second accommodating portions. The housing includes a fitting hole into which the shaft is fit. The plurality of magnets are respectively arranged adjacent to the plurality of needles. Each magnet has an S pole and an N pole corresponding to a first end side and a second end side of one of the needles, and attracts one of the needles by magnetic force to a first circumferential direction of the shaft. The plurality of first accommodating portions accommodate the plurality of needles, respectively. The plurality of second accommodating portions are respectively arranged adjacent to the first accommodating portions, and respectively accommodate the plurality of magnets.

14 Claims, 17 Drawing Sheets

(56) References Cited

U.S. PATENT DOCUMENTS

2002/0134974 A1\* 9/2002 Fujiwara ............... F16D 41/067
                                              254/391
2006/0248969 A1    11/2006 Seo et al.
2014/0062164 A1\*  3/2014 Spahr ..................... F16D 27/01
                                              301/6.9

FOREIGN PATENT DOCUMENTS

| JP | 4-191535 A   | 7/1992  |
|----|--------------|---------|
| JP | 6-54134 B2   | 7/1994  |
| JP | 10-238560 A  | 9/1998  |
| JP | 11-287261 A  | 10/1999 |
| JP | 2002-13558 A | 1/2002  |
| JP | 2006-300241 A| 11/2006 |

\* cited by examiner

ONE-WAY CLUTCH AND IMAGE FORMING APPARATUS

BACKGROUND OF THE INVENTION

Field of the Invention

The present invention relates to a one-way clutch that biases needles by magnetic force, and an image forming apparatus, such as a copying machine, a printer, a facsimile machine, or a multifunction machine having these multiple functions, equipped with such one-way clutch.

Description of the Related Art

In an image forming apparatus, a configuration is known where a one-way clutch is provided on a conveyance roller conveying a recording material such as a sheet, the one-way clutch allowing the conveyance roller to relatively rotate only in one direction with respect to the shaft.

The one-way clutch has needles, i.e., rollers, respectively arranged in a plurality of wedged spaces formed between the housing and the shaft. The one-way clutch is configured such that the housing is only relatively rotated in one direction with respect to the shaft by biasing the needles toward a direction where the wedged spaces are narrowed. A configuration is known where magnetic force of the magnets is utilized in the arrangement for biasing the needles.

For example, Japanese Examined Patent Publication No. 6-54134 proposes a configuration where biasing members formed of magnetic bodies, i.e., magnets, are arranged at even intervals in a circumferential direction, and biasing a roller by magnetic force, and supporting the shaft by the biasing members.

However, the configuration disclosed in Japanese Examined Patent Publication No. 6-54134 has the following problems. A roller is biased by the magnetic force of biasing members. At this time, depending on the magnetized positions of the biasing members, it may not be possible to provide sufficient attraction force to the biasing members to attract the roller, and transmission of drive may be unstable. This problem is especially obvious in a case where inexpensive magnets having weak magnetic forces are used.

SUMMARY OF THE INVENTION

The present invention provides a one-way clutch adopting a configuration where needles are biased by magnets, wherein even in a case where inexpensive magnets with relatively small magnetic force are used, the needles are attracted to the magnets stably during drive transmission.

The one-way clutch according to the present invention is configured to allow rotation in one direction with respect to a shaft and regulate rotation in the other direction, the one-way clutch including: a metal housing with a fitting hole into which the shaft is fit; a plurality of cylindrical needles formed of a magnetic body disposed within the housing at different positions in a circumferential direction of the shaft and arranged along an axial direction of the shaft; a plurality of magnets respectively arranged adjacent to the plurality of needles, each magnet having an S pole and an N pole corresponding to a first end side and a second end side of one of the needles, and configured to attract one of the needles by magnetic force to a first circumferential direction of the shaft; a plurality of first accommodating portions provided on the housing and accommodating the plurality of needles, respectively, each first accommodating portion including a cam surface formed on an outer radial side thereof and inclined inward in a radial direction as the cam surface extends in the first circumferential direction, configured to regulate the housing from rotating in the other direction with respect to the shaft in a case where the needle moves in the first circumferential direction within the first accommodating portion and enters a portion where a space between the cam surface and the shaft is narrowed, and configured to allow the housing to rotate in the one direction with respect to the shaft in a case where the needle moves in a second circumferential direction of the shaft which is opposite from the first circumferential direction within the first accommodating portion and retreats from the narrowed portion; and a plurality of second accommodating portions provided on the housing, respectively arranged adjacent to the first accommodating portions, and configured to accommodate the plurality of magnets, respectively.

Further features of the present invention will become apparent from the following description of exemplary embodiments with reference to the attached drawings.

DESCRIPTION OF THE EMBODIMENTS

First Embodiment

Figure 1:
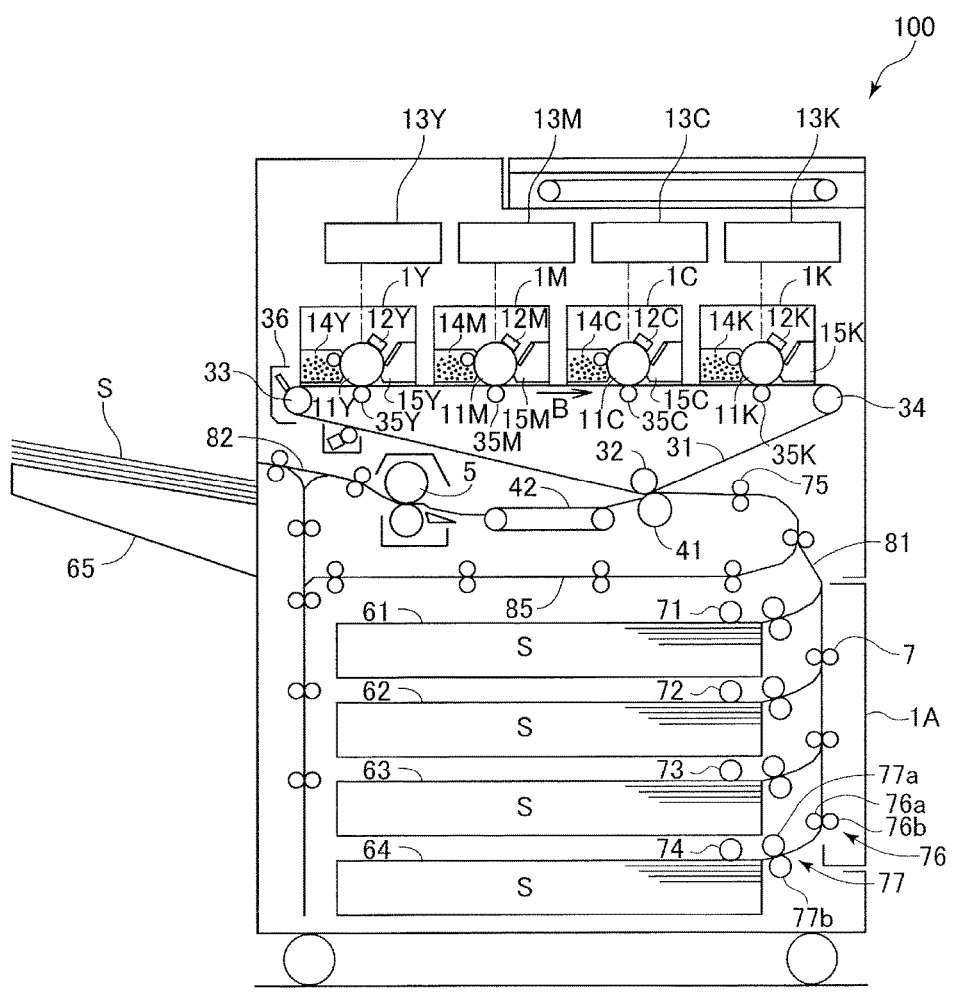
FIG. 1 is a cross-sectional view schematically illustrating a configuration of an image forming apparatus according to a first embodiment.

A first embodiment will be described with reference to FIGS. 1 through 9. First, a schematic configuration of the image forming apparatus according to the present embodiment will be described with reference to FIG. 1.

Image Forming Apparatus

An image forming apparatus 100 is a tandem intermediate transfer-type image forming apparatus having image forming units 1Y, 1M, 1C and 1K arranged in series on a horizontal section of an intermediate transfer belt 31. This type of image forming apparatus 100 forms a full-color image on a recording material S such as a sheet, for example paper or an OHP sheet, by electro-photographic system, based on image signals transmitted from an external apparatus such as a personal computer, or from a document reading apparatus.

The image forming units 1Y, 1M, 1C and 1K form toner images of respective colors, which are yellow, magenta, cyan and black, on photosensitive drums 11Y, 11M, 11C and 11K, and subject the toner images to primary transfer to the same image position on the intermediate transfer belt 31. The intermediate transfer belt 31 is stretched and rotated by a drive roller 33, a tension roller 34 and a transfer counter roller 32 performing secondary transfer. Primary transfer rollers 35Y, 35M, 35C and 35K performing primary transfer are arranged on an inner circumferential side of the intermediate transfer belt 31 at positions opposing to the photosensitive drums 11Y, 11M, 11C and 11K.

A surface of the photosensitive drum 11Y is charged uniformly by a charging unit 12Y. An exposing unit 13Y irradiates an imaging beam to the charged photosensitive drum 11Y and forms a latent image on the surface of the drum. A developing unit 14Y transfers yellow toner onto the latent image formed on the photosensitive drum 11Y, and forms a yellow toner image. The yellow toner image formed on the photosensitive drum 11Y is primarily transferred to the intermediate transfer belt 31 by applying a primary transfer bias to a primary transfer roller 35Y. Toner remaining on the photosensitive drum 11Y after the primary transfer of the toner image is removed by a cleaning member 15Y.

The magenta, cyan and black toner images are formed on respective photosensitive drums 11M, 11C and 11K in image forming units 1M, 1C and 1K, in a similar manner as the image forming unit 1Y. The respective toner images are transferred in a superposed manner on the yellow toner image on the intermediate transfer belt 31, by which a full-color toner image is formed on the intermediate transfer belt 31. The description of the configurations of the respective portions of the image forming units 1M, 1C and 1K are omitted, with the additional letters "Y" on the reference number respectively assigned to the configurations of the respective portions of the image forming unit 1Y respectively replaced with M, C and K.

On the other hand, the image forming apparatus 100 includes a plurality of cassettes 61, 62, 63 and 64 storing recording materials S. The recording material S stored in each cassette is conveyed to a recording material conveyance path 81 by the rotation of any one of the feed rollers 71, 72, 73 and 74, and reaches a registration roller 75. The registration roller 75 feeds the recording material S to a secondary transfer portion formed by contact of a secondary transfer roller 41 and a transfer counter roller 32, at a matched timing with the toner image on the intermediate transfer belt 31. Then, the toner image on the intermediate transfer belt 31 is transferred to the recording material S at the secondary transfer portion. The toner remaining on the intermediate transfer belt 31 after transfer is removed by a belt cleaning member 36.

Next, the recording material S to which the toner image has been transferred is conveyed via a conveyance belt 42 to a fixing unit 5, and the recording material S is subjected to heat and pressure at the fixing unit 5, by which a full-color toner image is fixed on the surface. The recording material S to which the toner image has been fixed passes a discharge conveyance path 82 and is discharged onto a sheet discharge tray 65. In the case of duplex printing, the recording material S on which the toner image has been fixed is conveyed to a duplex conveyance path 85, and then sent to the secondary transfer portion again, so that a toner image is formed on a rear surface of the recording material S.

Now, for example, conveyance roller pairs 76 and 77 provided on the recording material conveyance path 81 are driven to rotate by having power transmitted from a drive source such as a motor, and the recording material is conveyed. Power transmission from a drive source is performed, for example, using a transmission mechanism such as a belt and pulley, a gear train, and so on. Further, the conveyance roller pairs 76 and 77 are composed of drive rollers 76a and 77a to which power is transmitted, and driven rollers 76b and 77b biased toward the drive rollers 76a and 77a and forming a nip portion for nipping the recording material with the drive rollers 76a and 77a. The recording material is conveyed by having the conveyance roller pair rotate in a state where the recording material is nipped by the nip portion.

Recently, a technique is adopted where a rotational speed of the conveyance roller pair positioned downstream in the conveyance direction of the recording material in the recording material conveyance path 81 is accelerated, with the aim to reduce the interval between sequentially conveyed recording materials, and improve the productivity of the image forming apparatus.

In many image forming apparatuses, it is assumed that image forming is performed to a A4-size recording material, so the pitch between the respective conveyance roller pairs arranged in the recording material conveyance path 81 is set to be narrower than 210 mm, which is the length of A4-size material in a conveyance direction. Thus, the recording material is transferred smoothly from the upstream conveyance roller pair to the downstream conveyance roller pair.

For example, the recording material S fed from a cassette 64 is first conveyed by the upstream conveyance roller pair 77, and transferred to the downstream conveyance roller pair 76. In this state, the recording material S is nipped by both conveyance roller pairs 76 and 77. At this time, in a case where the rotational speed of the downstream conveyance roller pair 76 is accelerated, the recording material S is pulled between the conveyance roller pairs 76 and 77 by the difference in rotation speed with the upstream conveyance roller pair 77, and a trailing end side of the recording material S is dragged.

The conveyance roller pairs 76 and 77 are rollers formed of rubber and the like having a high frictional force, so that even if the recording material S is pulled, the recording material S hardly slide against the conveyance roller pairs 76 and 77. Therefore, the upstream conveyance roller pair 77 is configured to rotate idly in a case where the rotational speed of the downstream conveyance roller pair 76 is accelerated, by assembling a one-way clutch to a drive roller 77a of the upstream conveyance roller pair 77. Thereby, the recording material S is drawn out from the upstream conveyance roller pair 77, and conveyed in an accelerated manner by the downstream conveyance roller pair 76.

In a case where the one-way clutch is assembled to the conveyance roller pair 77, the one-way clutch is arranged on a same axis as the shaft between the shaft driven to rotate and the drive roller 77a. The one-way clutch transfers the drive of the shaft to the drive roller 77a, but in a case where the rotational speed of the drive roller 77a becomes faster than the rotational speed of the shaft, the clutch is configured to allow the drive roller 77a to rotate idly with respect to the shaft. Therefore, in a state where the downstream conveyance roller pair 76 is accelerated, the recording material S is pulled, and the rotational speed of the drive roller 77a becomes faster than the rotational speed of the shaft, by which the drive roller 77a is rotated idly, and the recording material S will be drawn out from the upstream conveyance roller pair 77.

One-way Clutch

A one-way clutch as described above will be described with reference to FIGS. 2A through 9. A one-way clutch 200 according to the present embodiment is configured to allow rotation in one direction and regulate rotation in the other direction with respect to a shaft 140, and includes a housing 210, a plurality of needles 220, and a combtoothed magnet 230 having a combtoothed shape.

The housing 210 is formed of metal and has an approximately cylindrical overall shape, and includes a fitting hole 150 to which the shaft 140 is fit. The housing 210 is formed, for example, by subjecting an iron/copper-based sintering material, or iron, stainless-steel, zinc or other sintering material, to porous sintering treatment. The housing 210 should preferably be formed of iron-based metal. In the present embodiment, the housing 210 is formed of iron-based metal subjected to porous sintering treatment, and the housing 210 is impregnated with lubricated oil with low viscosity before assembly to improve the abrasion resistance. The abrasion resistance of the housing 210 can be further improved by adding carbon and the like to the material.

The housing 210 can be either a magnetic body or a nonmagnetic body, but according to the present embodiment, the housing 210 is formed of a nonmagnetic body. Since the housing 210 is formed of a nonmagnetic body, the magnetic field formed by projected portions 231 of the combtoothed magnet 230 is applied efficiently to the needles 220, as described later, and the magnetic attraction force of the projected portions 231 increase. However, even if the housing 210 is formed of a magnetic body, the magnetic force acting on the needles 220 from the combtoothed magnet 230 via the housing 210 is small compared to the magnetic force directly acting on the needles 220 from the projected portions 231. Especially, the magnetic force is reduced greatly as the distance increases. Therefore, the influence that the housing 210 formed of a magnetic body has on the functions of the one-way clutch 200 is small.

Figure 2A:
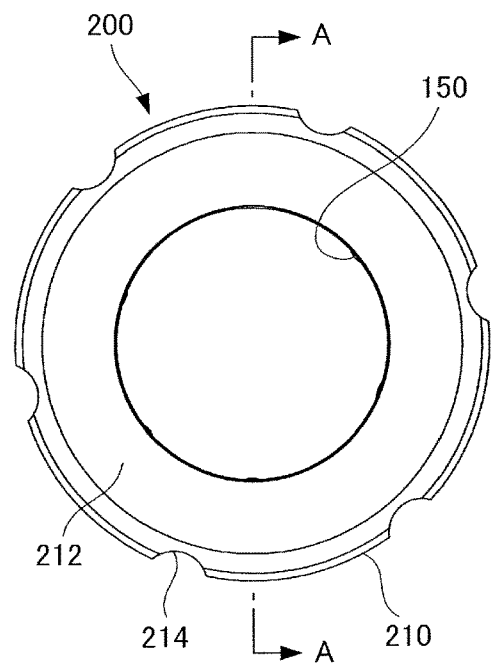
FIG. 2A is a front view of a one-way clutch according to a first embodiment.
Figure 2B:
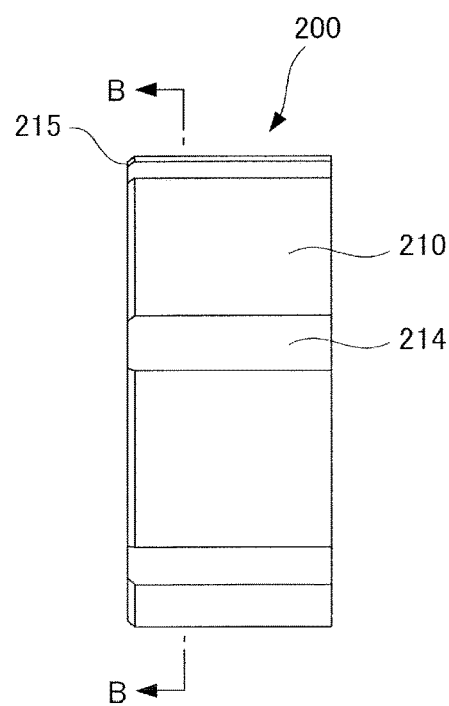
FIG. 2B is a side view of a one-way clutch according to the first embodiment.

The housing 210 as described above has, as illustrated in FIGS. 2A and 2B and FIGS. 3A and 3B, an approximately cylindrical body portion 211, a side surface portion 212, and pillar portions 213. As illustrated in FIGS. 2A and 2B, in the body portion 211, a plurality of grooves 214 are formed on the outer circumferential surface, and a chamfered portion 215 is formed on one end portion, i.e., left end portion of FIG. 2B and lower end portion of FIG. 3A, in an axial direction of the outer circumferential surface, i.e., axial direction of the shaft 140. The grooves 214 are respectively engaged with convex portions formed on a mounting hole when the housing 210 is mounted on the mounting hole of a rotary member such as the drive roller 77a or the gear to which the one-way clutch 200 is assembled. Thereby, rotation of the housing 210 with respect to the rotary member is regulated. Further, the chamfered portion 215 functions as a guide for inserting the housing 210 to the mounting hole.

Figure 3A:
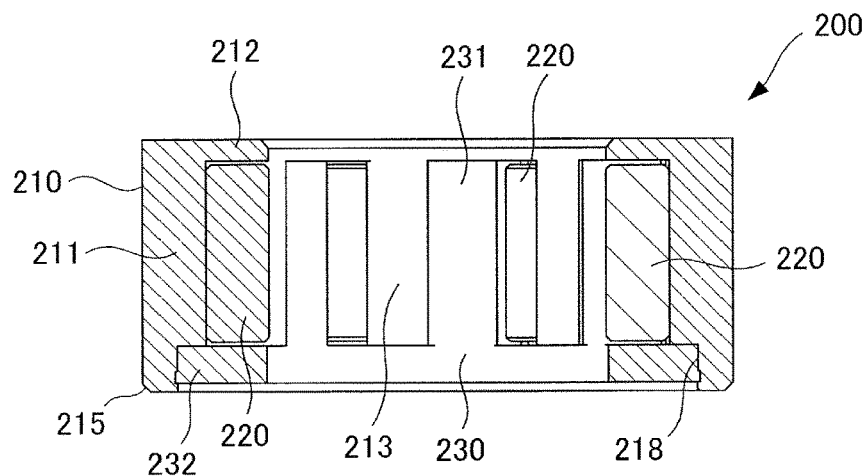
FIG. 3A is a cross-sectional view taken at A-A of FIG. 2A.

As illustrated in FIGS. 2A and. 3A, the side surface portion 212 is formed integrally with and covers the entire circumference of the body portion 211, so as to project inward in the radial direction from the other end in the axial direction, i.e., upper end of FIG. 3A, of the body portion 211. An inner side of the side surface portion 212 is penetrated cylindrically, an inner diameter of which is set somewhat greater than an outer diameter of the shaft 140 illustrated in FIGS. 4A and 4B, such that the shaft 140 is allowed to pass through the inner side of the side surface portion 212. The shaft 140 is, for example, a drive shaft to which drive from a motor is transmitted. In the present embodiment, the diameter of the shaft 140 is set to 8 mm, so that a dimensional tolerance of the diameter of the shaft 140 is between −0.01 and −0.05. The shaft 140 illustrated in FIG. 4A and subsequent drawings is shorter than the actual shaft for sake of description.

Figure 3B:
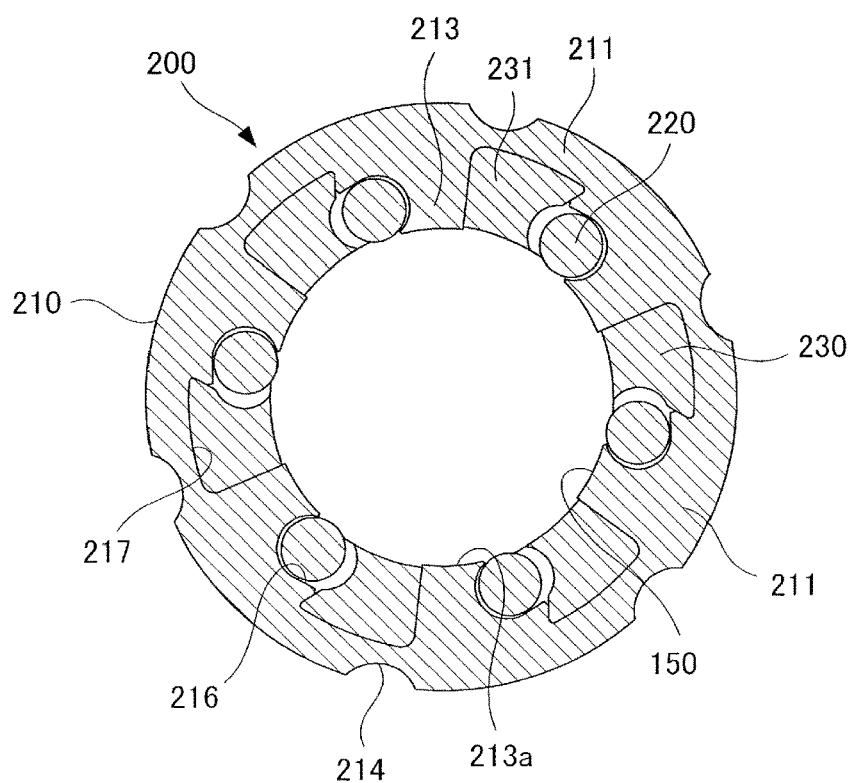
FIG. 3B is a cross-sectional view taken at B-B of FIG. 2B.

As illustrated in FIGS. 3A and 3B, the pillar portions 213 are formed at even intervals to project inward in the radial direction from a plurality of locations in the circumferential direction of the inner circumferential surface of the body portion 211. In the present embodiment, the number of pillar portions 213 is six. Inner end faces in the radial direction, i.e., inner circumferential surfaces, of the respective pillar portions 213 are formed to be provided on approximately the same virtual cylindrical surface. In other words, a single approximately cylindrical surface is formed by connecting inner circumferential surfaces 213a of the respective pillar portions 213. That is to say, the inscribed circle is approximately cylindrical. A diameter of the inscribed circle of the respective pillar portions 213 is set slightly smaller than a diameter of the inner circumferential surface of the side surface portion 212. Therefore, the diameter of the inscribed circle of the housing 210 is equal to the diameter of the inscribed circle, i.e., the inner circumferential surfaces 213a, of the respective pillar portions 213. Further, the inner circumferential surfaces 213a of the respective pillar portions 213 are formed concentric with the outer circumferential surface of the housing 210, constituting the fitting hole 150 into which the shaft 140 described later is fit, and act as a sliding surface capable of sliding against the shaft 140.

Figure 5A:
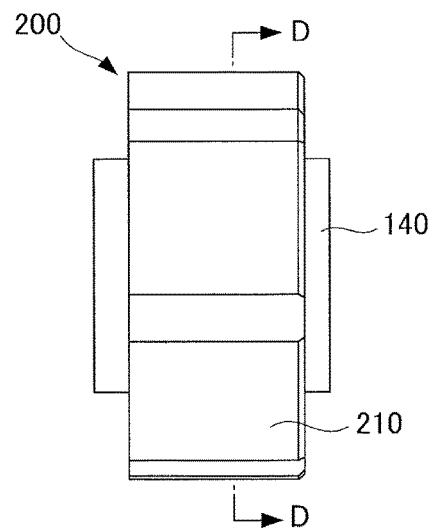
FIG. 5A is a side view of a state where the shaft is inserted to the one-way clutch according to the first embodiment.
Figure 5B:
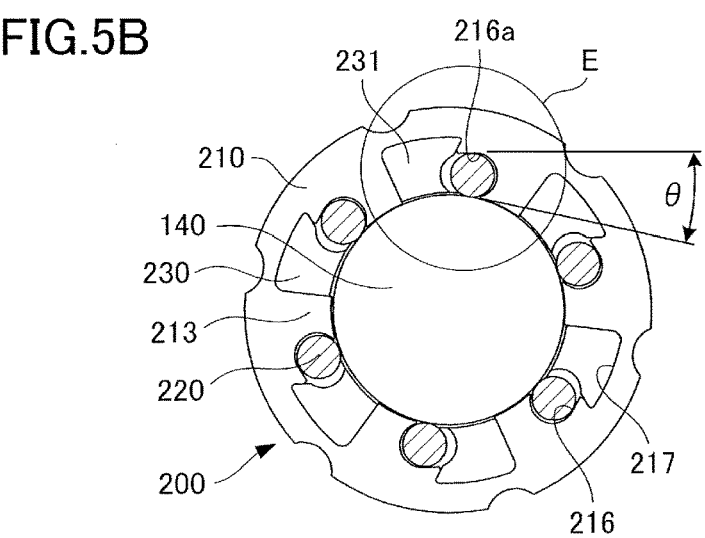
FIG. 5B is a cross-sectional view taken at D-D of FIG. 5A.
Figure 5C:
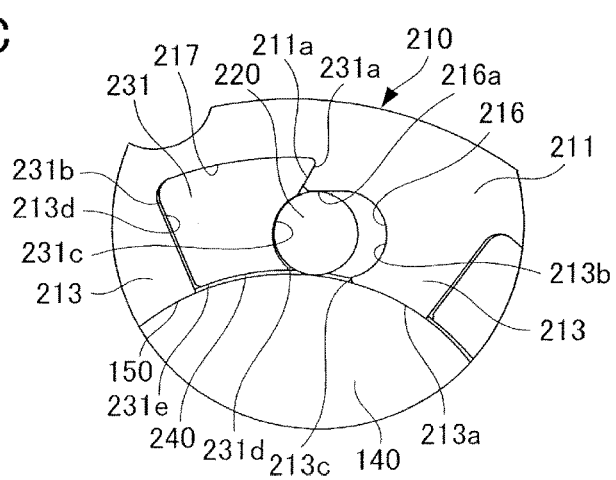
FIG. 5C is an enlarged view of portion E of FIG. 5B.

Further, as illustrated in FIGS. 3B, 5B and 5C, first accommodating portions 216 and second accommodating portions 217 opening inwardly in the radial direction are formed at a plurality of locations in the circumferential direction respectively between pillar portions 213 arranged adjacently in the circumferential direction of the housing 210. Needles 220 are respectively arranged in the first accommodating portions 216. Further, a plurality of projected portions 231 of the combtoothed magnet 230 is respectively arranged in the second accommodating portions 217, as described later.

Each first accommodating portion 216 has a cam surface, i.e., inclined surface 216a, on the outer radial side thereof, inclined inwardly in the radial direction as the cam surface extends in a first circumferential direction of the shaft 140. In the illustrated example, the cam surface 216a is inclined inward in the radial direction as the cam surface extends in a counterclockwise direction in FIGS. 3B, 5B and 5C. Further, the cam surface 216a is formed on an inner circumferential surface adjacent to the side of the first circumferential direction, i.e., side of the counterclockwise direction, out of the respective pillar portions 213 of the entire inner circumferential surface of the body portion 211. Thereby, as illustrated in FIGS. 5A through 5C, a wedged space whose space in the radial direction is narrowed toward the first circumferential direction is formed between each cam surface 216a and the outer circumferential surface of the shaft 140 in a state where the shaft 140 is fit to the one-way clutch 200. In the present embodiment, the cam surface 216a has an inclined angle e (FIG. 5B) of approximately 7 to 10 degrees with respect to a tangential line at a position where it contacts the needle 220 of the shaft 140.

The distance within the wedged space is set so that it is the same as or slightly smaller than the diameter of the needle 220 at the first circumferential direction side, and greater than the diameter of the needle 220 at a second circumferential direction side of the shaft 140, which is the opposite direction from the first circumferential direction. That is, the wedge space formed between the first accommodating portions 216 and the shaft 140 is designed to be narrow at the left side in the drawing of FIG. 5C and wider at the side of the pillar portions 213 at the right side in the drawing. Further, the width of each first accommodating portion 216 in the circumferential direction is set sufficiently greater than the diameter of the needle 220, so as to allow the needle 220 to move in the circumferential direction within the first accommodating portion 216.

A side surface of the pillar portion 213 on the side of the first accommodating portion 216, i.e., the side surface in the first circumferential direction, is formed as a curved surface 213b curved in a dented manner toward the second circumferential direction, and an inner end portion in the radial direction is projected in the first circumferential direction to form a projection 213c. Thereby, a space enabling the needles 220 to move in the circumferential direction is ensured, and the width in the circumferential direction between an inner end portion in the radial direction of the projected portion 231 of the combtoothed magnet 230 described later and the projection 213c is narrowed.

The second accommodating portions 217 are formed adjacent to the first accommodating portions 216 in the first circumferential direction in a manner communicated with the first accommodating portions 216. The projected portions 231 of the combtoothed magnet 230 are arranged in the second accommodating portions 217, as described later. Therefore, the first accommodating portions 216 function as needle accommodating portions in which the needles 220 are respectively arranged, and the second accommodating portions 217 serving as magnet accommodating portions in which the projected portions 231 are respectively arranged.

The second accommodating portions 217 are formed to have a wider space extending outward in the radial direction than the first accommodating portions 216. Each second accommodating portion 217 forms a space projected at an acute angle toward the second circumferential direction, that is, the clockwise direction of FIG. 5C, toward the first accommodating portion 216 side, radially outward than the first accommodating portions 216. In other words, a first inclined surface 211a inclined further toward the first circumferential direction as the surface approximates the radial inward direction from the outer circumferential surface of each second accommodating portion 217 is formed to the portions of the body portion 211 of the housing 210 where the second accommodating portions 217 are formed. On the other hand, a side surface of each pillar portion 213 on the side of the second accommodating portion 217, i.e., side surface in the second circumferential direction, is formed as a second inclined surface 213d that is inclined in the direction opposite to the first inclined surface 211a. That is, the second inclined surface 213d is a plane that is inclined further downstream in the second circumferential direction as the inclined surface extends inward in the radial direction. The distance between the first inclined surface 211a and the second inclined surface 213d is narrowed toward the radial inward direction.

Further, a cylindrical surface portion 218 having an inner diameter greater than the outer diameter of the outer circumferential surface of the second accommodating portion 217 is formed at the one end in the axial direction of the housing 210. Further, as illustrated in FIG. 4B, an engaging groove 219 is formed across the entire circumference on the inner circumferential surface of the one end side in the axial direction of the cylindrical surface portion 218.

The plurality of needles 220 (six, in the present embodiment) are formed of an iron-based or corrosion-resistant steel-based magnetic body, and they are respectively arranged in the first accommodating portions 216, as described earlier. A martensite-based stainless steel SUS 440C (JIS G 4303) relatively resistant to rust as a magnetic metal, or parallel pins (JIS B 1354-1988) and the like can be used to form the needles 220.

The needles 220 can be a parallel pin, or it can have a crowning shape with a greater outer diameter at the center in the axial direction than at the end portions. Further according to the present specification, the needles also include rolling elements such as rollers. In the present embodiment, parallel pins formed of iron-based magnetic body are used as the needles 220. The diameter the needles is set to 2 mm, and the dimensional tolerance of the diameters is set to +0 and −0.01 mm.

Figure 4A:
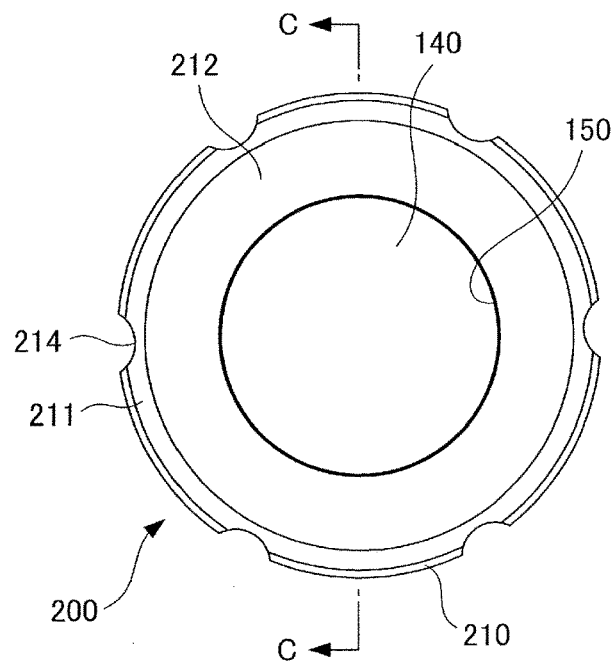
FIG. 4A is a front view illustrating a state where a shaft is inserted to the one-way clutch according to the first embodiment.
Figure 4B:
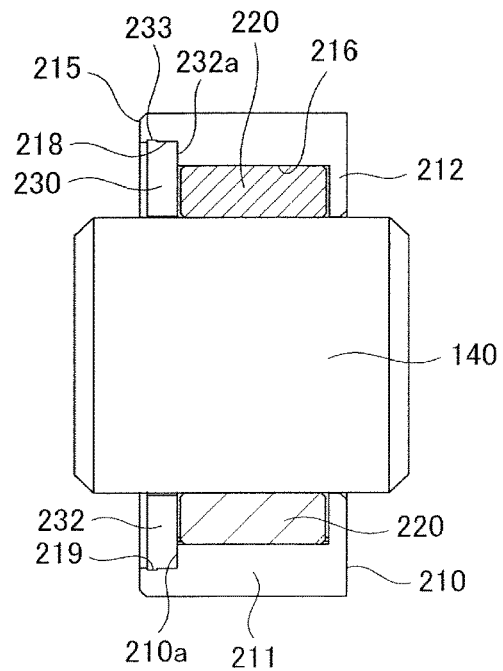
FIG. 4B is a cross-sectional view taken at C-C of FIG. 4A.
Figure 6:
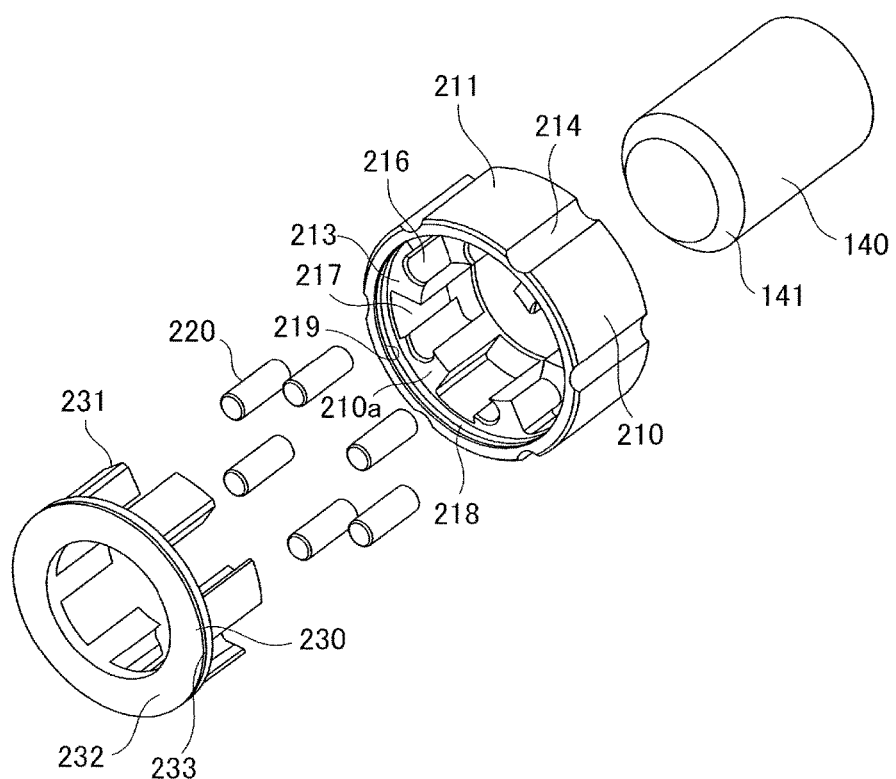
FIG. 6 is an exploded perspective view of the one-way clutch according to the first embodiment.

As illustrated in FIGS. 3A, 4B and 6, the combtoothed magnet 230 as the magnet unit includes an annular portion 232, and projected portions 231 projected in the center axis direction of the annular portion 232 from multiple positions in the circumferential direction of the annular portion 232, so that the overall shape of the magnet is combtoothed. This combtoothed magnet 230 is a magnet formed of resin. For example, the combtoothed magnet is formed by molding magnetic resin created by kneading and mixing magnetic powder to resin having flexibility such as urethane, nylon elastomer, rubber and the like. The magnetic powder is hard magnetic material powder or soft magnetic material powder of rare earth magnet material, such as alnico, boron, ferrite, neodymium, cobalt, samarium and so on. Then, the molded material is magnetized by applying a strong magnetic field to form the combtoothed magnet 230.

The annular portion 232 is formed so that its outer diameter is equal to or somewhat smaller than the inner diameter of the cylindrical surface portion 218 of the housing 210, and so that its inner diameter is greater than the outer diameter of the shaft 140. Moreover, a projecting strip 233 is formed on the entire circumference on the outer circumferential surface at the one end in the axial direction of the annular portion 232.

The projected portions 231 as a plurality of magnets are formed at even intervals in the circumferential direction of the annular portion 232, and the number of projected portions 231 corresponds to the number of a plurality of second accommodating portions 217 in the housing 210. The projected portions 231 are formed so that its cross-sectional shape orthogonal to the axial direction approximately corresponds to the cross-sectional shape of the second accommodating portions 217, as illustrated in detail in FIG. 5C. In other words, the projected portions 231 are formed with a circumferential width that is wider on the outer radial direction side than on the inner radial direction side. Actually, a side surface in the second circumferential direction on the outer radial direction of the projected portion 231 is formed as a first engaging surface 231a that is inclined further toward the first circumferential direction as it approximates the inner radial direction along the first inclined surface 211a of the housing 210. On the other hand, a side surface in the first circumferential direction of the projected portion 231 is formed as a second engaging surface 231b inclined further toward the second circumferential direction as it approximates the inner radial direction along the second inclined surface 213d of the housing 210.

Further, a curved surface 231c curved in a dented manner toward the first circumferential direction is formed on the side surface in the second circumferential direction of each projected portion 231 at the inner radial direction side of the first engaging surface 231a. The curved surface 231c has a radius of curvature approximately equal to the radius of the needles 220 or somewhat greater than the radius of the needles 220. Thus, the area in which the needles 220 contact or closely oppose to the projected portions 231 is increased, and the needles 220 are enabled to easily approximate the projected portions 231 as much as possible. According to this arrangement, the force in which the needles 220 are attracted by the magnetic property of the projected portions 231 is increased, and the response of the one-way clutch 200 is improved.

Further, the inner end in the radial direction of the side surface in the second circumferential direction of the projected portion 231 is formed as a projection 231d projected in the second circumferential direction by forming the curved surface 231c as described above. The projection 231d is opposed to the projection 213c of the pillar portions 213. The distance between the projection 231d and the projection 213c is set smaller than the outer diameter of the needles 220.

Further, inner end faces in the radial direction, i.e., inner circumferential surfaces, of the plurality of projected portions 231 is formed to be arranged on approximately the same virtual cylindrical surface. That is, if inner circumferential surfaces 231e of the respective projected portions 231 are connected along the circumferential direction, approximately a single cylindrical surface is formed. In other words, the inscribed circle is approximately cylindrical. The inscribed circle of the plurality of projected portions 231 is set greater than the inscribed circle of the housing 210, that is, the inscribed circle of the respective pillar portions 213.

As illustrated in FIG. 6, the combtoothed magnet 230 arranged as above is inserted together with the plurality of needles 220 from the one end side in the axial direction of the housing 210 into the housing 210. Then, as illustrated in FIGS. 3A and 3B, the plurality of needles 220 are respectively arranged on the plurality of first accommodating portions 216 of the housing 210, and the plurality of projected portions 231 are respectively accommodated in the plurality of second accommodating portions 217.

In this state, as illustrated in FIG. 4B, the annular portion 232 of the combtoothed magnet 230 is internally-fit to the cylindrical surface portion 218 at the one end portion, that is, left end portion of FIG. 4B, in the axial direction of the housing 210. Further, a side surface 232a on the other side, that is, right end side of FIG. 4B, in the axial direction of the annular portion 232 contacts a stepped surface 210a of the housing 210, and a projecting strip 233 of the annular portion 232 is press fit in a state where the projecting strip 233 is compressed elastically to the engaging groove 219, and locked. Thereby, the combtoothed magnet 230 is mounted in a state where the magnet 230 is retained in the axial direction with respect to the housing 210.

Further, as illustrated in FIG. 5C, in a state where the projected portions 231 are accommodated in the second accommodating portions 217, the first engaging surface 231a of the projected portion 231 and the first inclined surface 211a of the housing 210, and the second engaging surface 231b and the second inclined surface 213d, are respectively engaged. Thus, the projected portions 231 are prevented from moving in the inner radial direction, and the projected portions 231 are positioned in the radial direction.

Further, the plurality of needles 220 are arranged within the first accommodating portions 216 between the pillar portions 213 of the housing 210 and the projected portions 231 of the combtoothed magnet 230. In this state, the distance between the projections 231d formed on the inner end in the radial direction of the projected portions 231 and the projections 213c formed on the inner end in the radial direction of the pillar portions 213 is set smaller than the outer diameter of the needles 220, so that the needles 220 are prevented from falling in the inner radial direction from the first accommodating portions 216. In other words, even in a state where the shaft 140 is not inserted to the one-way clutch 200, that is, even in the one-way clutch 200 alone, the needles 220 are prevented from falling in the inner radial direction.

Figure 7:
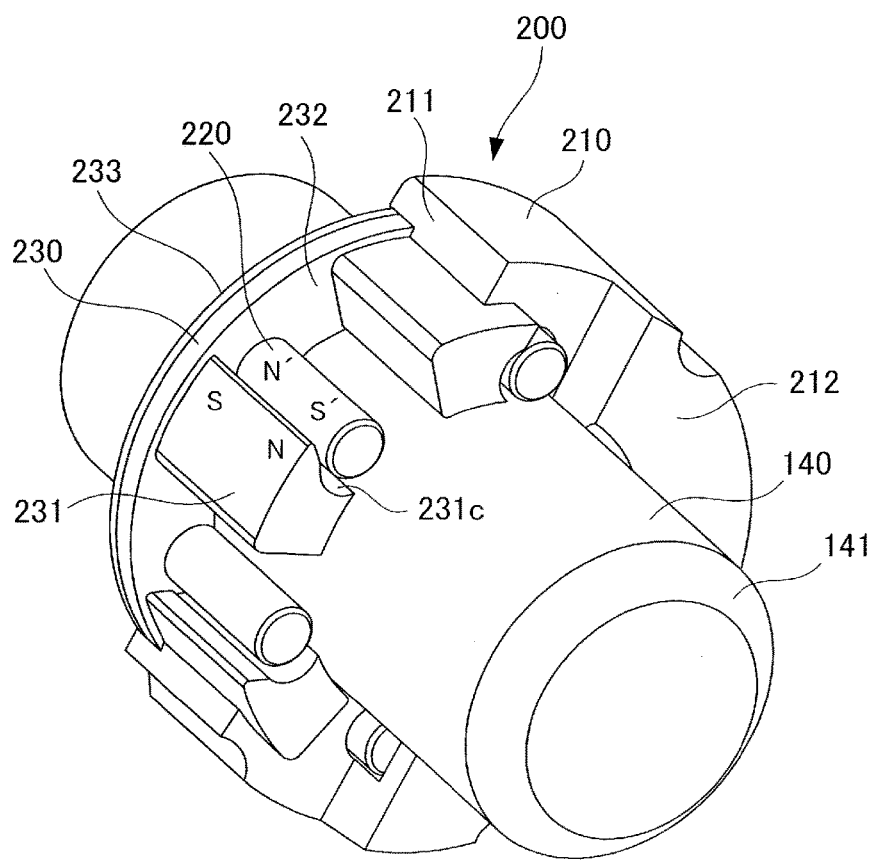
FIG. 7 is a perspective view illustrating a state where the shaft is inserted to the one-way clutch according to the first embodiment, with a portion cut away.

Similarly, the distance between the projection 231d and the projection 213c is determined so that in the one-way clutch 200 alone, at least the amount of projection of the needles 220 from the inner circumferential surfaces 213a of the pillar portions 213 is set as follows. That is, even if the needles 220 are positioned at a narrowest position within the first accommodating portion 216, that is, left end position of FIG. 5C, where the wedged space is formed, the needles are set to be projected more than the minimum value of tolerance of the diameter of the shaft 140. As illustrated in FIGS. 6 and 7, a chamfered portion 141 is formed at an end portion of the shaft 140. Therefore, in a state where the shaft 140 is inserted, the plurality of needles 220 projected in the inner radial direction are guided by the chamfered portion 141 and moved to the outer radial direction. Therefore, even if the needles 220 are projected to the inner radial direction, the insertion of the shaft 140 is performed smoothly.

Further, as illustrated in FIG. 4B, the needles 220 arranged in the first accommodating portions 216 are positioned between the annular portion 232 of the combtoothed magnet 230 and the side surface portion 212 of the housing 210. Therefore, the needles 220 are prevented from falling in the axial direction from the first accommodating portions 216. The length of the needles 220 in the axial direction are set somewhat smaller than the distance between the annular portion 232 and the side surface portion 212 so that a slight gap is formed between the both end faces of the needles 220 and the annular portion 232 or the side surface portion 212. Thereby, the needles 220 are enabled to easily move within the first accommodating portions 216.

By having the projected portion 231 of the combtoothed magnet 230 enter the second accommodating portions 217, the needles 220 arranged in the first accommodating portions 216 adjacent thereto are enabled to be biased toward the first circumferential direction by magnetic force. In other words, the needles 220 are magnetically attracted to the projected portion 231.

As described, the one-way clutch 200 is obtained by assembling the plurality of needles 220 and the combtoothed magnet 230 to the housing 210. The shaft 140 is fit to the fitting hole 150 of the one-way clutch 200.

In a state where the shaft 140 tends to relatively rotate in a counterclockwise direction of FIGS. 5B and 5C, i.e., first circumferential direction, with respect to the housing 210, the needles 220 are moved to the first circumferential direction within the first accommodating portions 216 while being attracted by the magnetic force of the projected portions 231 of the combtoothed magnet 230. Then, the needles 220 enter the narrow portion of the wedged space, by which a contact pressure of the needles 220, the cam surfaces 216a and the outer circumferential surface of the shaft 140 is increased, such that the shaft 140 and the housing 210 are locked and relative rotation is disabled. In other words, the needles 220 are moved in the first circumferential direction within the first accommodating portions 216 and enter the portions where the distance between the cam surfaces 216a and the shaft 140 is narrow, by which the rotation of the housing 210 in the other direction with respect to the shaft 140 is regulated.

On the other hand, in a case where the shaft 140 is relatively rotated in the clockwise direction, i.e., second circumferential direction, of FIGS. 5B and 5C with respect to the housing 210, the needles 220 biting into the narrow portions of the wedged spaces are released. That is, the needles 220 are moved in the second circumferential direction within the first accommodating portions 216, and the needles 220 enter the wide portions of the wedged space. Then, the contact pressure of the needles 220, the cam surfaces 216a and the outer circumferential surface of the shaft 140 is lowered, such that the shaft 140 is unlocked and enabled to rotate, i.e., rotate idly, relatively in the clockwise direction with respect to the housing 210. In other words, the housing 210 is allowed to rotate in the one direction with respect to the shaft 140 by the needles 220 moving in the second circumferential direction within the first accommodating portions 216 and retreating from the narrow portions.

Further, the needles 220 have a dimensional tolerance of diameter, as described later. Therefore, if the change of distance of the first accommodating portions 216 in the radial direction constituting the wedged space is small with respect to the circumferential direction, the locking or unlocking of the one-way clutch 200 as described above may not be performed reliably, depending on the diameter of the needles 220. Therefore, according to the present embodiment, the cam surfaces 216a are extended in the circumferential direction, and the width of the first accommodating portions 216 in the circumferential direction is increased, so that the distance in the radial direction of the first accommodating portions 216 is changed greatly with respect to the circumferential direction. Thereby, even in a case where the diameter of the needles 220 is minimum within the range of dimensional tolerance, the needles 220 bite into the narrowed portions of the wedged space, so that the one-way clutch 200 is locked reliably. On the other hand, even in a case where the diameter of the needles 220 is maximum within the range of dimensional tolerance, the needles 220 are released from the narrowed portions of the wedged space, and the one-way clutch 200 is unlocked reliably.

As described above, the inscribed circle of the plurality of projected portions 231 is greater than the inscribed circle of the housing 210. Therefore, the outer circumferential surface of the shaft 140 slides against the inner circumferential surfaces 213a of the respective pillar portions 213 of the housing 210 during idle rotation. With respect thereto, a gap 240 is formed between the inner circumferential surfaces 231e of the plurality of projected portions 231 and the outer circumferential surface of the shaft 140. That is, the projected portions 231 are arranged to oppose to the peripheral surface of the shaft 140. The projected portions 231 are positioned so as not to contact the peripheral surface of the shaft 140, by providing a gap 240 between the projected portions 231 and the peripheral surface of the shaft 140. Therefore, the inner circumferential surfaces, serving as slide surfaces, of the respective pillar portions 213 function as a slide friction-type bearing that slides against the outer circumferential surface of the shaft 140 in a state where the one-way clutch 200 is rotating idly. Therefore, it is preferable to enhance the abrasion resistance and the sliding performance of the inner circumferential surfaces 213a.

According to the present embodiment, lubricating oil having low viscosity is impregnated in the housing 210 before assembly. Therefore, the oil is gradually oozed out during use of the one-way clutch 200, and supplied to the sliding portion between the inner circumferential surfaces 213a of the pillar portions 213 of the housing 210 and the shaft 140. Thereby, the abrasion resistance of the inner circumferential surfaces 213a is enhanced. On the other hand, the oozed oil is accumulated in the gap 240 between the inner circumferential surfaces 231e of the projected portions 231 and the shaft 140. In the present embodiment, the gap 240 is set to be 0.1 mm or greater and 1 mm or smaller in the radial direction. In other words, the gap 240 functions as an oil reservoir. As a result, the oil accumulated in the gap 240 is supplied from the gap 240 to the sliding portion between the inner circumferential surfaces 213a of the pillar portions 213 and the shaft 140, so that the lubricating effect by the oil gathered in the sliding portion is maintained for a long period of time. Further, fine abrasion powder having magnetic properties generated at the contact portion between the needles 220 and the shaft 140 is magnetically attracted to the inner circumferential surface 231e of the projected portions 231 of the combtoothed magnet 230. Therefore, the outer circumferential surface of the shaft 140 is maintained clean for a long period of time, and the durability is improved further.

Further, the respective pillar portions 213 of the housing 210 are fit to the shaft 140 by transition fit. That is, the inner circumferential surface of the housing 210 is designed to fit to the shaft 140 by transition fit. A fitting dimension of the inner circumferential surfaces 213a of the respective pillar portions 213 to which the shaft 140 is fit and the outer circumferential surface of the shaft 140 should preferably be set as follows. It is preferable to realize a fitting dimension (JIS B 0401-2 1998) so that the diameter of the inscribed circle, i.e., inner diameter, of the respective pillar portions 213 is between H8 and H9, and the accuracy of dimension of the outer circumferential surface of the shaft 140 is between h7 and h8 corresponding to a level of a centerless polished material so-called a G material. Further, a surface roughness of the outer circumferential surface of the shaft 140 should preferably have a maximum height Ry of approximately 0.8 μm.

According to the configuration of the present embodiment, the needles 220 are directly attracted to the combtoothed magnet 230, so that the shaft 140 does not have to be formed of a material having magnetic property. For example, a stainless steel material, or an aluminum subjected to hard alumite treatment, can also be used as the shaft 140. However, the shaft 140 can also be formed of a magnetic body, similar to a second embodiment described later.

Figure 8:
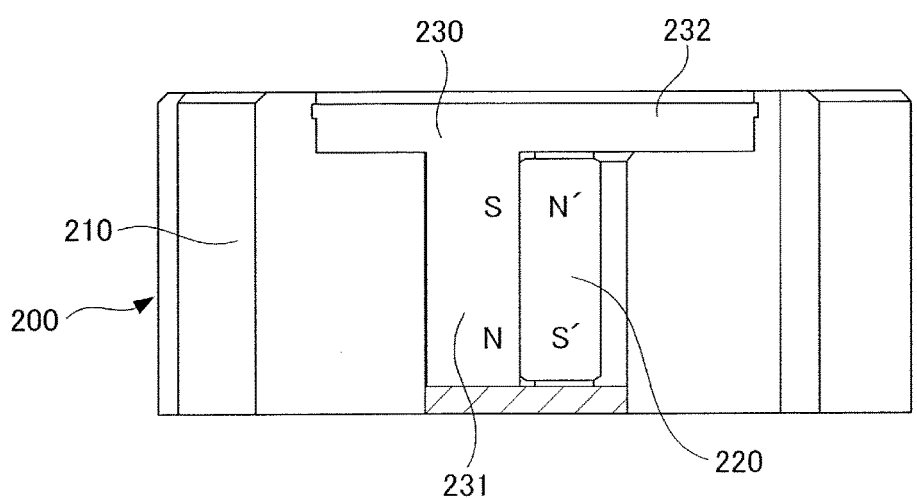
FIG. 8 is a cross-sectional view illustrating a relationship of magnetic poles between a combtoothed magnet and needles according to the one-way clutch of the first embodiment.
Figure 9:
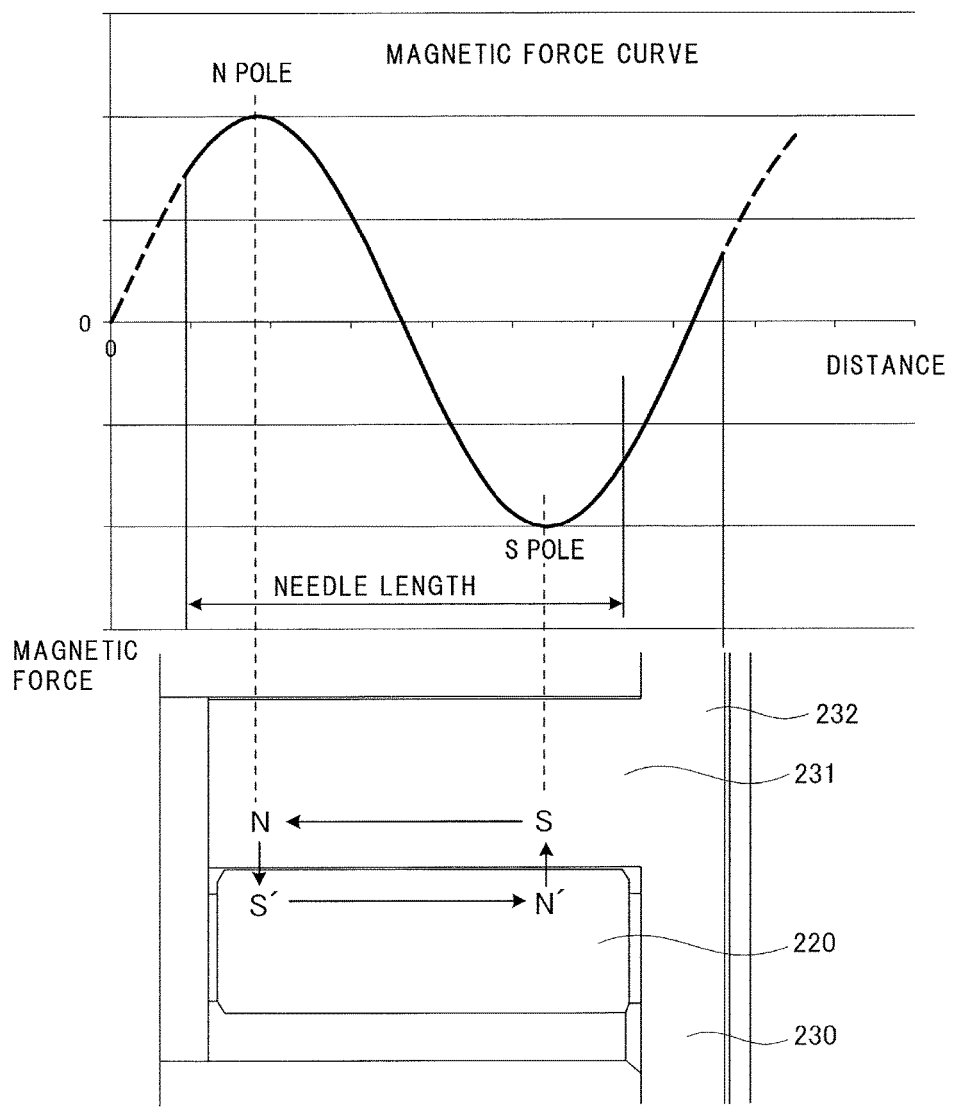
FIG. 9 is a schematic diagram illustrating a relationship of the combtoothed magnet and magnetic force curve of the one-way clutch according to the first embodiment.

Next, a relationship of magnetic poles of the combtoothed magnet 230 and the needles 220 will be described with reference to FIGS. 7 through 9. FIG. 7 is a perspective view illustrating the configuration where the shaft 140 is mounted to the one-way clutch 200 with a portion cut away, and FIG. 8 is a cross-sectional view of the combtoothed magnet 230 cut to pass the projected portion 231 and the needles 220. FIG. 9 is a schematic diagram having arranged a portion of the cross-sectional view of FIG. 8 so that a longitudinal direction, i.e., axial direction, of the needles 220 is set as a horizontal axis, and a graph of the magnetic force curve regarding the longitudinal direction is illustrated on the upper side of the sheet above the cross-sectional view. The horizontal axis of the graph of FIG. 9 represents the longitudinal position of the needle 220, and the vertical axis represents the magnetic force.

As illustrated in FIGS. 7 through 9, according to the present embodiment, the peaks of the S pole and the N pole of each projected portion 231 of the combtoothed magnet 230 are arranged within a range of longitudinal length of the needle 220 on the side of the projected portion 231 opposed to the needle 220. In other words, the combtoothed magnet 230 is magnetized so that the S pole and N pole of each projected portion 231 are arranged within the range of longitudinal length of the needle 220. Thereby, each needle 220 is separated into an N' pole and an S' pole corresponding to the magnetic pole of the projected portion 231, and a magnetic circuit circulating from N to S', S' to N', N' to S and S to N poles is formed. A mutual attraction force is increased compared to a case where a magnetic circuit is not formed, by forming a magnetic circuit by the projected portions 231 of the combtoothed magnet 230 and the needles 220. In other words, each projected portion 231 has S pole and N pole corresponding to the first end side and the second end side of one of the plurality of needles 220, and attracts the plurality of needles 220 by magnetic force in the first circumferential direction.

Further, as illustrated in FIG. 8, the length of the projected portion 231 is set somewhat longer than the length of the needles 220, so that the needles 220 can move in the longitudinal direction. Therefore, the positions of the S poles and N poles of the projected portions 231 are set within a range opposing to the needles 220 even in a case where the needles 220 move in the longitudinal direction. For example, the S poles and N poles are arranged so that the N poles and S poles are positioned inward from both end portions of the needles 220 by a distance equal to or greater than a difference between the length of the needles 220 and the length of the projected portions 231, in a state where a center position of the needles 220 in the longitudinal direction corresponds to the center position of the projected portions 231 in the longitudinal direction. In the present embodiment, as illustrated in FIG. 9, the peaks of the N pole and the S pole are arranged inward from the longitudinal range of the needles 220. In other words, each projected portion 231 has the peaks of magnetic force of the S pole and the N pole within the range in which each needle 220 is arranged with respect to the axial direction of the shaft 140.

Thereby, a magnetic circuit can be formed more reliably between the projected portions 231 and the needles 220, and the needles 220 can be suppressed from being inclined when the needles 220 are magnetically attracted to the projected portions 231.

Now, we will describe the result of a study on a configuration where the peaks of the S pole and the N pole are arranged at both ends in the axial direction including the annular portion of the combtoothed magnet. According to this study, the peaks of the magnetic poles are positioned at the leading end side of each projected portion and at the annular portion, so that the magnetic force acting on the needles is stronger at the leading end side in the longitudinal direction and weaker at the annular portion side. Therefore, a phenomenon occurred where the needles were inclined with respect to the projected portions. According to this arrangement, a backlash occurred from a state where the needles are inclined to a state where they are arranged in parallel with the projected portions, and the response of the one-way clutch was deteriorated. Further, in a state where the inclined needles were moved in the circumferential direction of the one-way clutch, the needles were wrenched, so that increase of friction torque occurred.

As described above, it had been recognized that the magnetic poles should be arranged within the longitudinal length of the needles to attract the needles to the magnets via a minimum distance by the magnetic force, by which less inclination of the needles was caused.

Therefore, according to the present embodiment, in molding the combtoothed magnet 230, the magnets as strong magnetic bodies are arranged within the mold, and the peak positions of the magnetic poles of the projected portions 231 are formed on the inner side than the longitudinal length of the needles 220. Thereby, a magnetic circuit is formed between the needles 220 and the projected portions 231, and the needles are suppressed from being inclined in a state where the needles 220 are magnetically attracted. As a result, problems such as the deterioration of response of the one-way clutch 200 or the increase of friction torque are suppressed.

The present embodiment adopting the above-described configuration enables to provide a one-way clutch 200 having a high durability at a low cost in a configuration where the needles 220 are biased by magnetic force. In the present configuration, the member sliding against the shaft 140 is the metal housing 210, instead of the combtoothed magnet 230 formed of resin. Specifically, the diameter of the inscribed circle of the projected portion 231 of the combtoothed magnet 230 is formed greater than the diameter of the inscribed circle of the pillar portions 213 of the housing 210. Thereby, during idle rotation of the one-way clutch 200, the inner circumferential surfaces 213a of the pillar portions 213 formed of metal slide against the shaft 140, so that the durability is increased compared to a configuration where the combtoothed magnet 230 formed of resin slides against the shaft 140.

Further, oil is impregnated in the housing 210, so that oil is gradually supplied to the sliding area between the pillar portions 213 and the shaft 140. Therefore, the sliding and abrasion resistance of the inner circumferential surfaces 213a of the pillar portions 213 improve, and the durability enhance even further.

Further, peaks of the S poles and N poles are arranged within the range of longitudinal length of the needles 220 on the surfaces of the projected portions 231 opposing to the needles 220. Therefore, the needles 220 are less liable to be inclined while they are attracted by magnetic force and move toward the projected portions 231, and thus, the deterioration of response and increase of friction torque of the one-way clutch 200 caused by the inclination of the needles 220 are suppressed.

Moreover, the one-way clutch 200 is composed of the housing 210, the plurality of needles 220 and the combtoothed magnet 230, so that the number of components is reduced, and the costs are cut down.

Second Embodiment

Figure 10:
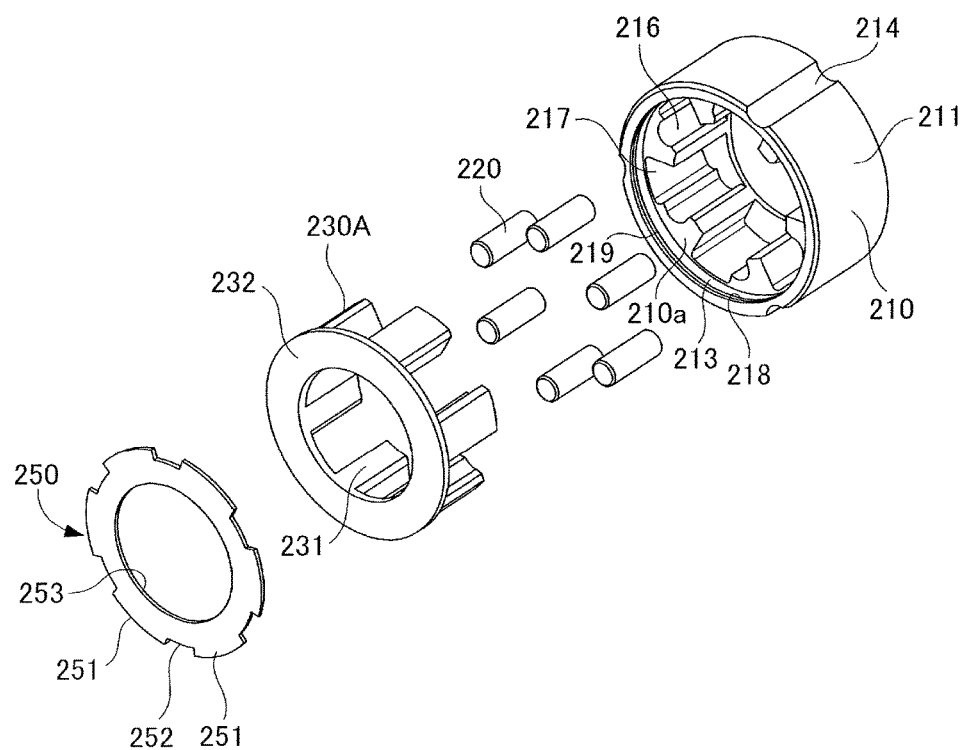
FIG. 10 is an exploded perspective view of a one-way clutch according to a second embodiment.

A second embodiment will now be described with reference to FIGS. 10 and 11. According to the first embodiment described above, the projecting strip 233 is provided on the outer circumferential surface of the annular portion 232 of the combtoothed magnet 230, by which the magnet 230 is retained on the housing 210. In contrast, according to the present embodiment, the projecting strip 233 is omitted from a combtoothed magnet 230A, and a retaining member 250 is provided separately. Further, the shaft 140A is formed of a magnetic body. The other configurations and actions are the same as the first embodiment described above, so that similar configurations are denoted with the same reference numbers, the descriptions thereof are either omitted or simplified, and the areas that differ from the first embodiment are mainly described.

The one-way clutch 200A according to the present embodiment includes a retaining member 250. The retaining member 250 is arranged detachably to the housing 210 on an outer side than the combtoothed magnet 230A on one side in an axial direction, i.e., on a left side of FIGS. 10 and 11, of the housing 210. Then, in a state where the retaining member 250 is mounted to the housing 210, the retaining member 250 prevents the combtoothed magnet 230A from falling toward the one side in the axial direction of the housing 210.

The retaining member 250 is formed of a magnetic body, and the entire body is approximately ring-shaped, with a through hole formed at a center of an approximately disk-like shape. Further, the retaining member 250 is formed of a metal plate with elasticity, such as a plate spring. For example, a stainless steel plate having a magnetic property, such as a SUS440C, or an iron-based metal plate, is formed into an approximately ring-like shape to form the retaining member 250.

The retaining member 250 has a plurality of claw portions 251 that project from an outer circumferential edge to the outer radial direction. Concaved portions 252 are formed between each of the plurality of claw portions 251. A diameter of a circumscribed circle of the plurality of claw portions 251 is set greater than an inner diameter of the cylindrical surface portion 218 of the housing 210 and smaller than an outer diameter of a bottom portion of the engaging groove 219. On the other hand, a diameter of a circumscribed circle of the concaved portions 252 is set to be smaller than the inner diameter of the cylindrical surface portion 218. A through hole 253 formed to penetrate the center portion of the retaining member 250 is designed so that an inner diameter of the through hole 253 is set somewhat greater than the outer diameter of the shaft 140A.

Further, the retaining member 250 is designed so that a plate thickness including the plurality of claw portions 251 is narrower than the width of the engaging groove 219. For example, the plate thickness of the retaining member 250 is set to 0.3 mm, and the width of the engaging groove 219 is set to 0.5 mm. Thereby, the plurality of claw portions 251 is allowed to enter the engaging groove 219 of the housing 210

As described, the outer circumferential surface of the annular portion 232 of the combtoothed magnet 230A is formed as a cylindrical surface, without the projecting strip 233 as according to the first embodiment. The shaft 140A is formed of a magnetic body. According to the present embodiment, the shaft is formed of metal having a magnetic property.

Similar to the first embodiment, the plurality of needles 220 and the combtoothed magnet 230A are assembled to the housing 210. Thereafter, the retaining member 250 is attached from the one end side, that is, left side of FIGS. 10 and 11, on the annular portion 232 side, in the axial direction of the housing 210. At this time, the retaining member 250 is mounted by pushing the plurality of claw portions 251 into the engaging groove 219 of the housing 210. When mounting the retaining member, the retaining member 250 is picked up using tweezers, for example, and the plurality of claw portions 251 are bent and sequentially inserted into the engaging groove 219. At this time, since a plurality of concaved portions 252 are respectively formed between the plurality of claw portions 251, the respective claw portions 251 are bent easily, and the respective claw portions 251 are inserted easily to the engaging groove 219. When the respective claw portions 251 are entered to the engaging groove 219, the respective claw portions 251 are locked to the engaging groove 219 by elastic restoring force, and the retaining member 250 is mounted to the housing 210. As a result, a one-way clutch 200A as illustrated in FIG. 11 is obtained, with the retaining member 250 placed inward than the one end face of the housing 210 in the axial direction, and the combtoothed magnet 230A is retained from falling to the one end side in the axial direction.

Figure 11:
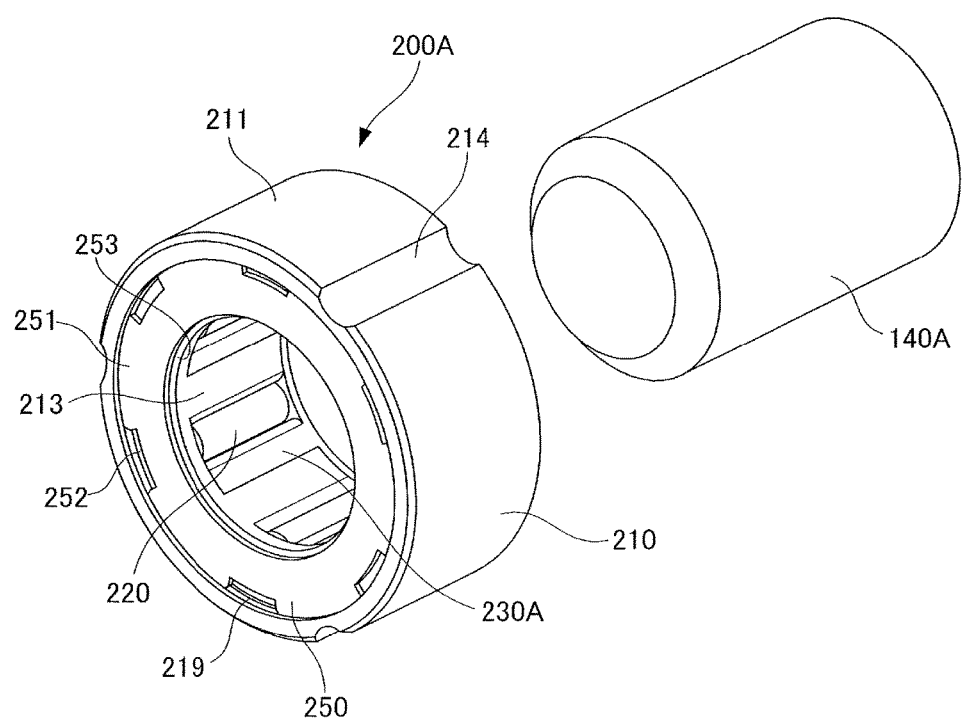
FIG. 11 is a perspective view of the one-way clutch according to the second embodiment.
Figure 12:
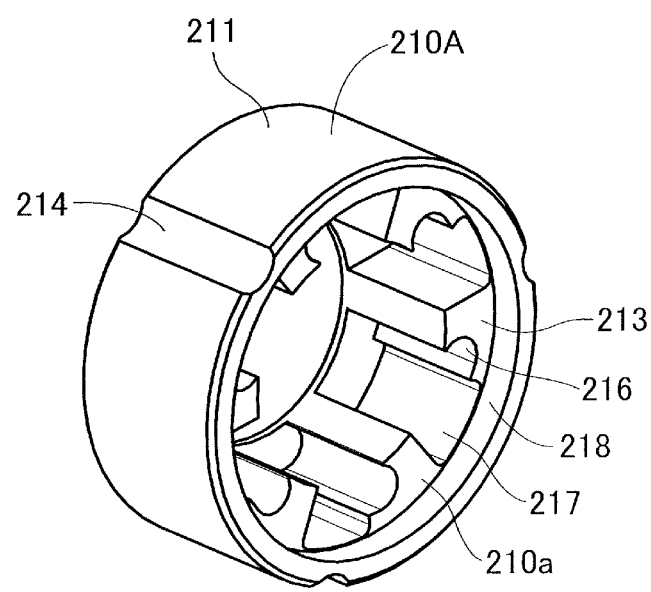
FIG. 12 is a perspective view of a housing of a one-way clutch according to a third embodiment.
Figure 13:
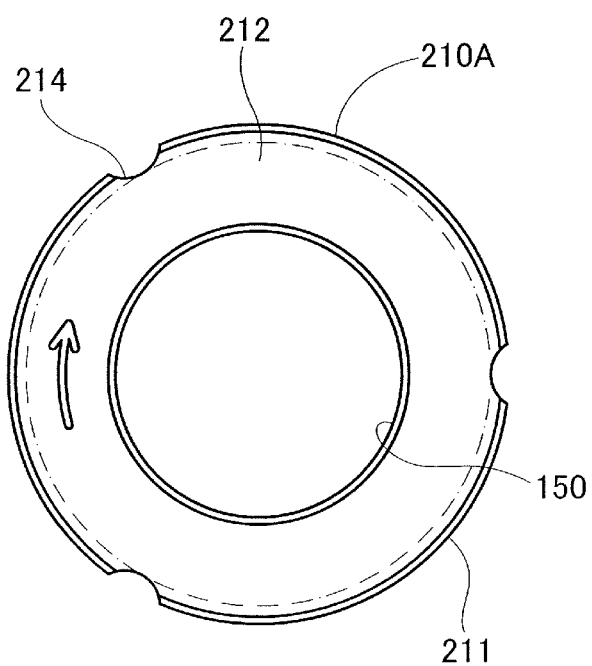
FIG. 13 is a front view of the housing of the one-way clutch according to the third embodiment.

The one-way clutch 200A configured as above is mounted by fitting the shaft 140A formed of a magnetic body thereto, as illustrated in FIG. 11. At this time, the outer circumferential surface of the shaft 140A and an inner circumferential edge of the through hole 253 of the retaining member 250 are closely opposed to one another throughout the entire circumference. In other words, a slight gap is formed throughout the entire circumference between the outer circumferential surface of the shaft 140A and the through hole 253 of the retaining member 250. According to the present embodiment, the dimensional tolerance of the shaft 140A is set to a minus tolerance of −0.01 to −0.05 mm, while the tolerance of the inner diameter of the through hole 253 of the retaining member 250 is set to an over tolerance of approximately 0 to 0.2 mm. Thus, a slight gap is formed between the outer circumferential surface of the shaft 140A and the through hole 253 of the retaining member 250.

At this time, since the retaining member 250 and the shaft 140A are formed of a magnetic body, a magnetic field is formed between the retaining member 250 and the shaft 140A by the magnetic force of the combtoothed magnet 230A. Therefore, a magnetic seal is formed across the entire circumference in the gap between the outer circumferential surface of the shaft 140A and the through hole 253 of the retaining member 250. Therefore, foreign substance such as magnetic powder is suppressed from intruding into the one-way clutch 200A through this gap from the outer side.

In the image forming apparatus, for example, a magnetic powder such as carrier having a magnetic property or toner having a magnetic property tends to exist in the space within the device. Therefore, foreign substance such as the magnetic powder may easily intrude within the one-way clutch 200A having the combtoothed magnet 230A. When a foreign substance enters the clutch, the plurality of needles 220 are prevented from moving smoothly, according to which the response of the one-way clutch 200A may be deteriorated, or the durability may be deteriorated.

Therefore, as according to the present embodiment, a magnetic seal is formed between the retaining member 250 and the shaft 140A, according to which foreign substance such as magnetic powder is suppressed from entering the clutch. As a result, the space between the plurality of needles 220 within the clutch, the shaft 140A and the cam surface 216a is maintained clean form a long period of time, the movement of the plurality of needles 220 is maintained smooth for a long period of time, and the response of the one-way clutch 200A is ensured for a long period of time. Furthermore, a long life of the one-way clutch 200A is realized.

Third Embodiment

A third embodiment will be described with reference to FIGS. 12 through 17. In the first embodiment described above, the projecting strip 233 is provided on the outer circumferential surface of the annular portion 232 of the combtoothed magnet 230, by which the magnet 230 is retained with respect to the housing 210. In contrast, according to the present embodiment, a projection 260 is formed to a portion of the projected portion 231A of a combtoothed magnet 230B, by which the magnet is retained with respect to the housing 210A. Other configurations and operations are similar to the first embodiment described above, so that in the following description, similar configurations are denoted with the same reference numbers and the descriptions and drawings are either omitted or simplified, and the areas different from the first embodiment will mainly be described.

Figure 14A:
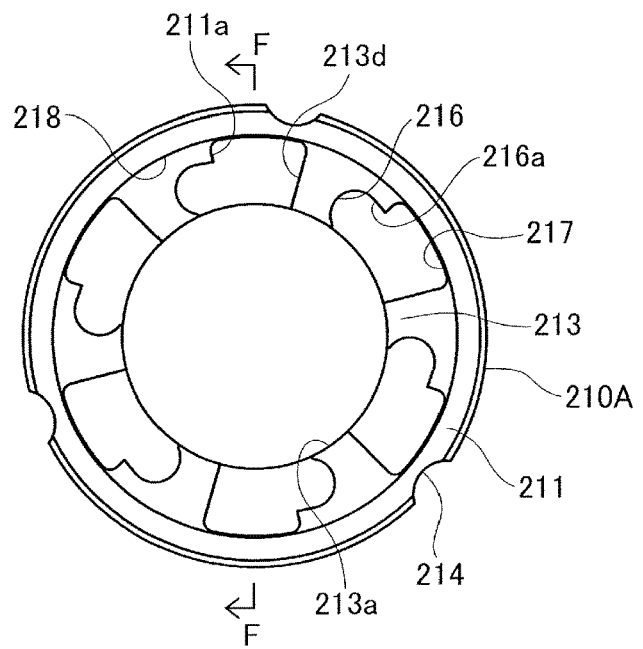
FIG. 14A is a rear view of the housing of the one-way clutch according to the third embodiment.
Figure 14B:
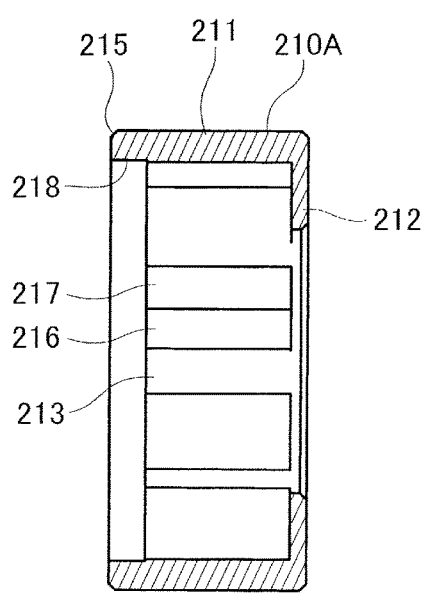
FIG. 14B is a cross-sectional view taken at F-F of FIG. 14A.

As illustrated in FIGS. 12, 13, 14A and 14B, the housing 210A includes an approximately cylindrical body portion 211, aside surface portion 212, and pillar portions 213. The basic configuration of the housing 210A is similar to the first embodiment. However, an engaging groove 219 is not formed on the cylindrical surface portion 218 at the one end portion in the axial direction of the housing 210A, i.e., end portion in the right side of FIG. 12, which differs from the first embodiment. That is, as illustrated in FIGS. 14A and 14B, the cylindrical surface portion 218 is formed as a single cylindrical surface without grooves and the like. The number of the plurality of grooves 214 formed on the outer circumferential surface of the body portion 211 can be different from the first embodiment, but it can also be the same as the first embodiment.

Figure 15:
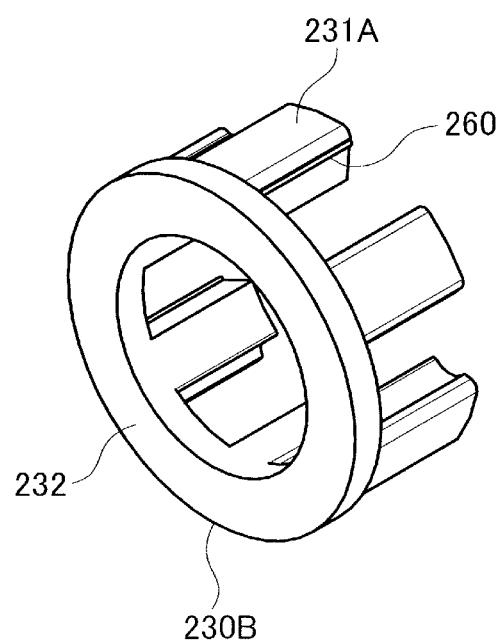
FIG. 15 is a perspective view of a combtoothed magnet according to the third embodiment.
Figure 16A:
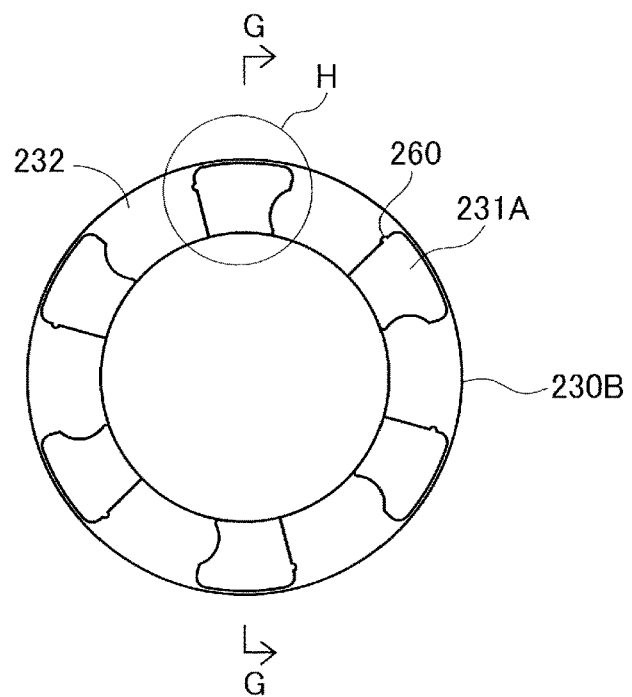
FIG. 16A is a front view of the combtoothed magnet of the one-way clutch according to the third embodiment.
Figure 16B:
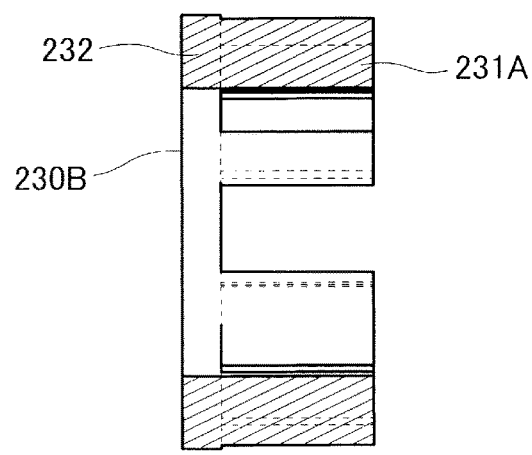
FIG. 16B is a cross-sectional view taken at G-G of FIG. 16A.

As illustrated in FIGS. 15, 16A and 16B, the combtoothed magnet 230B includes an annular portion 232, and projected portions 231A provided at a plurality of locations in the circumferential direction of the annular portion 232 and projected along a center axis direction of the annular portion 232, such that the entire body is formed in a combtoothed shape. The basic configuration of the combtoothed magnet 230B is similar to the first embodiment. However, there is no projecting strip 233 formed on the outer circumferential surface of the annular portion 232, different from the first embodiment. That is, the outer circumferential surface of the annular portion 232 is formed as a single cylindrical surface without any projecting strips and so on. The outer diameter of the annular portion 232 is set equal to the inner diameter of the cylindrical surface portion 218 of the housing 210A, or somewhat smaller than the inner diameter thereof.

Figure 17:
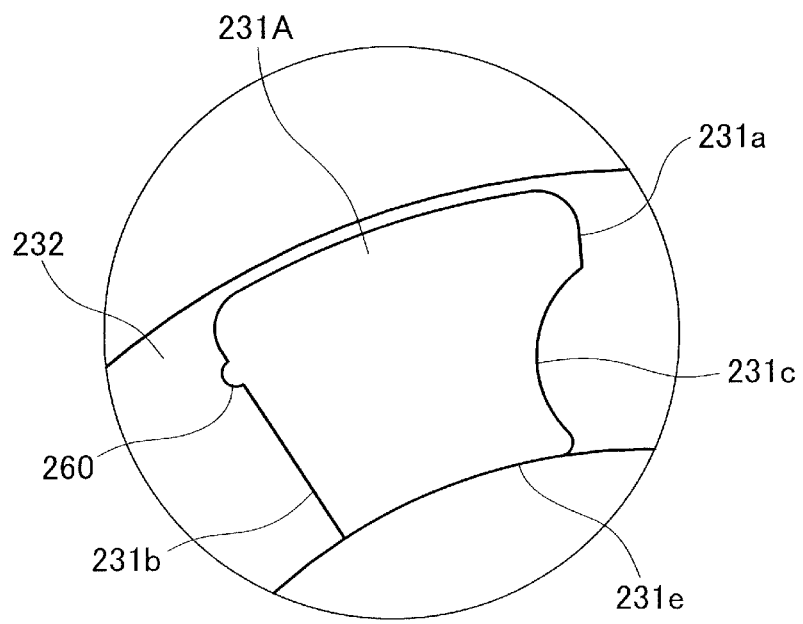
FIG. 17 is an enlarged view of portion H of FIG. 16A.

The combtoothed magnet 230B of the present embodiment forms a projection 260 projecting in a circumferential direction at a portion of the projected portion 231A, which differs from the first embodiment. As illustrated in FIGS. 15 and 16, the projection 260 is formed along an axial direction on one side surface in the circumferential direction of each of the projected portions 231A. Actually, as illustrated in FIGS. 15 and 17, a single projection 260 is formed to each of the projected portions 231A across the entire area in the axial direction of the projected portion 231A on a portion of the second engaging surface 231b of each projected portion 231A. In the illustrated example, the projection 260 is designed so that the cross-sectional shape of the projection orthogonal to the axial direction is approximately semicircular, but it can be other shapes.

According to the projections 260, in a state where the projected portions 231A are accommodated in the second accommodating portions 217, the projections 260 are designed to be compressively deformed by contact with the wall surfaces in the circumferential direction of the second accommodating portions 217. Specifically, the projections 260 contact the second inclined surface 213d of the housing 210, and are compressively deformed. Thereby, the first engaging surfaces 231a of the projected portions 231A are engaged with the first inclined surface 211a of the housing 210, and the projections 260 contact the second inclined surfaces 213d in an elastically compressed state. As described, the combtoothed magnet 230B is retained in the axial direction with respect to the housing 210A by the respective projected portions 231A being inserted to the second accommodating portions 217 with the projections 260 elastically compressed.

Now, since the load applied to the one-way clutch in the axial direction during use is small, the combtoothed magnet 230B is retained sufficiently by providing the projections 260 at the circumferential direction of the respective projected portions 231A. As a result, the combtoothed magnet 230B is retained with respect to the housing 210A, without having to form projecting strips 233 as according to the first embodiment, or having to provide a retaining member 250 as according to the second embodiment. The assembling property of the combtoothed magnet 230 is improved, and the costs of the one-way clutch are cut down.

That is, in a case where a projecting strip 233 as according to the first embodiment is provided, an engaging groove 219 for locking the projecting strip 233 must be formed on the housing. Further, according to this case, in assembling the combtoothed magnet to the housing, the projecting strip 233 is locked to the engaging groove 219 by elastically deforming and arranging the projecting strip 233 in the engaging groove 219, so that assembling work may be time-consuming. In contrast, according to the present embodiment, the engaging groove 219 may not be formed on the housing, so that the manufacturing steps may be reduced and costs can be cut down. Further, in assembling the combtoothed magnet 230B to the housing 210A, the projected portions 231A to which the projections 260 are formed should simply be press-fit in the axial direction to the housing 210A. Therefore, assembly is facilitated compared to the operation of locking the projecting strip 233 to the engaging groove 219.

Further according to the second embodiment, a separate retaining member 250 is required, and when assembling the retaining member 250 to the housing, the respective claw portions 251 are elastically deformed while inserting the retaining member to the engaging groove 219. In contrast, the present embodiment does not require a retaining member 250, so that the costs are cut down. Further, since the assembling of the combtoothed magnet 230B to the housing 210A is performed by press-fitting the projected portion 231A in the axial direction to the housing 210A, the assembly is facilitated compared to the operation of locking the respective claw portions 251 of the retaining member 250 to the engaging groove 219.

According to the present embodiment, the projections 260 are formed to a portion of the second engaging surfaces 231b of the projected portions 231A, but the position in which the projections 260 are formed can be a portion of the first engaging surfaces 231a or a portion of the outer circumferential surface of the projected portions 231A. However, in a case where the projections are formed on the outer circumferential surface of the projected portion 231A, it is difficult to guarantee a gap between the inner circumferential surfaces 231e of the projected portions 231A and the outer circumferential surface of the shaft, so that it is preferable to form the projections 260 to be projected in the circumferential direction from any one of the side surfaces in the circumferential direction of the projected portions 231A.

According to the above description, the projections 260 are formed across the entire area in the axial direction of the projected portions 231A, but the projections 260 can be formed as a single projection or a plurality of projections partially in the axial direction. Further, the number of projections 260 on each projected portion 231A can be more than one, instead of one, and in that case, the projections 260 can be formed at multiple locations in the radial direction.

The projection 260 can be formed to at least one of the projected portions 231A among the plurality of projected portions 231A. However, even in that case, it is preferable that the positions of the respective projections 260 in the radial and axial directions formed with respect to the plurality of projected portions 231A are the same, and that the number of projections 260 is the same. Further in this case, it is preferable to form the projections 260 to a plurality of projected portions symmetrically with respect to a cross-section passing a center axis of the combtoothed magnet 230B, and more preferably, it is preferable to form projections 260 on all projected portions 231A.

Other Embodiments

The one-way clutch illustrated in the respective embodiments described above can be applied to image forming apparatuses such as copying machines, printers, facsimiles, or multifunctional apparatuses equipped with multiple functions. The one-way clutch can also be applied to plotters or bookbinding apparatuses, and further, it can be applied to any other device adopting such one-way clutch.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-254723, filed Dec. 25, 2015, which is hereby incorporated by reference herein in its entirety.

What is claimed is:

1. A one-way clutch configured to allow rotation in one direction with respect to a shaft and regulate rotation in the other direction, the one-way clutch comprising:
   a housing formed of metal with a fitting hole into which the shaft is fit;
   a plurality of cylindrical needles formed of a magnetic body disposed within the housing at different positions in a circumferential direction of the shaft and arranged along an axial direction of the shaft;
   a plurality of magnets respectively arranged adjacent to the plurality of cylindrical needles, each magnet comprising an S pole peak portion where a magnetic force takes a peak value on S pole side and an N pole peak portion where a magnetic force takes a peak value on N pole side located different positions in the axial direction of the shaft, a distance between the S pole peak portion and the N pole peak portion in the axial direction of the shaft being shorter than a total length of an adjacent needle;
   a plurality of first accommodating portions provided on the housing and accommodating the plurality of needles, respectively, each first accommodating portion (i) comprising a cam surface formed on an outer radial side thereof and inclined inward in a radial direction as the cam surface extends in a first circumferential direction of the shaft, (ii) configured to regulate the housing from rotating in the other direction with respect to the shaft in a case where the needle moves in the first circumferential direction within the first accommodating portion and enters a narrowed portion where a space between the cam surface and the shaft is narrowed, and (iii) configured to allow the housing to rotate in the one direction with respect to the shaft in a case where the needle moves in a second circumferential direction of the shaft which is opposite from the first circumferential direction within the first accommodating portion and retreats from the narrowed portion; and
   a plurality of second accommodating portions provided on the housing, respectively arranged adjacent to the first accommodating portions, and configured to accommodate the plurality of magnets, respectively.

2. The one-way clutch according to claim 1, wherein the magnets are formed of resin containing magnetic powder.

3. The one-way clutch according to claim 1, wherein the magnets are arranged to oppose to a peripheral surface of the shaft, and the magnets are positioned with a gap formed between the magnets and the peripheral surface of the shaft such that the magnets do not contact the peripheral surface of the shaft.

4. The one-way clutch according to claim 1, wherein the housing is formed of iron-based metal.

5. The one-way clutch according to claim 1, further comprising a magnet unit including (i) an annular portion and (ii) a plurality of projected portions provided at a plurality of portions in the circumferential direction of the annular portion and projecting in the axial direction, the projected portions respectively accommodated in the second accommodating portions of the housing and capable of biasing the needles arranged in adjacent first accommodating portions by magnetic force toward the first circumferential direction,
   wherein the plurality of projected portions is the plurality of magnets.

6. The one-way clutch according to claim 5, wherein the magnet unit comprises at least one projection projecting from at least one of the plurality of projected portions, and in a case where the projected portions are accommodated in the second accommodating portions, the projection is compressively deformed by being in contact with a wall surface in a circumferential direction of the second accommodating portions.

7. The one-way clutch according to claim 1, further comprising a retaining member (i) removably arranged with respect to the housing at one side in the axial direction of the housing and on an outer side than the magnets and (ii) configured to prevent the magnets from falling out to the one side in the axial direction in a state where the magnets are mounted to the housing.

8. The one-way clutch according to claim 7, wherein the retaining member is formed of a magnetic body.

9. The one-way clutch according to claim 1, wherein the housing is a nonmagnetic body.

10. The one-way clutch according to claim 1, wherein oil is impregnated in the housing.

11. An image forming apparatus comprising:
   a shaft;
   a rotary member; and
   a one-way clutch according to claim 1 arranged between the shaft and the rotary member.

12. The image forming apparatus according to claim 11, wherein an inner circumferential surface of the housing of the one-way clutch is configured to fit to the shaft by transition fit.

13. An image forming apparatus comprising:
   a shaft formed of a magnetic body;
   a rotary member; and
   a one-way clutch according to claim 8 arranged between the shaft and the rotary member.

14. The one-way clutch according to claim 1, wherein the plurality of cylindrical needles comprise iron.

* * * * *